No. 860,944. PATENTED JULY 23, 1907.
H. C. SHAW & V. CHARTENER.
GEARING.
APPLICATION FILED DEC. 28, 1906.
3 SHEETS—SHEET 2.
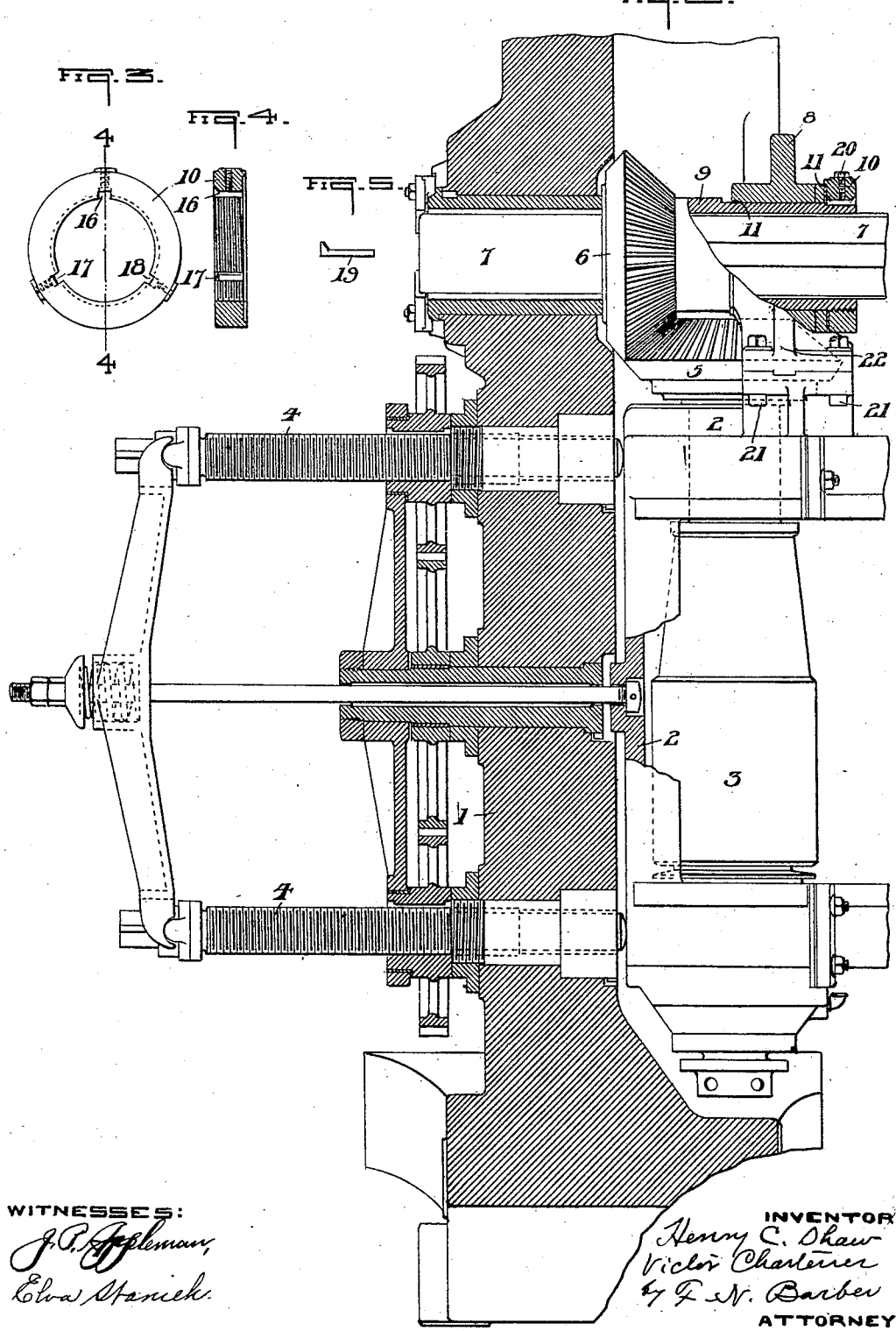
WITNESSES:
INVENTOR
Henry C. Shaw
Victor Chartener
by F. N. Barber
ATTORNEY

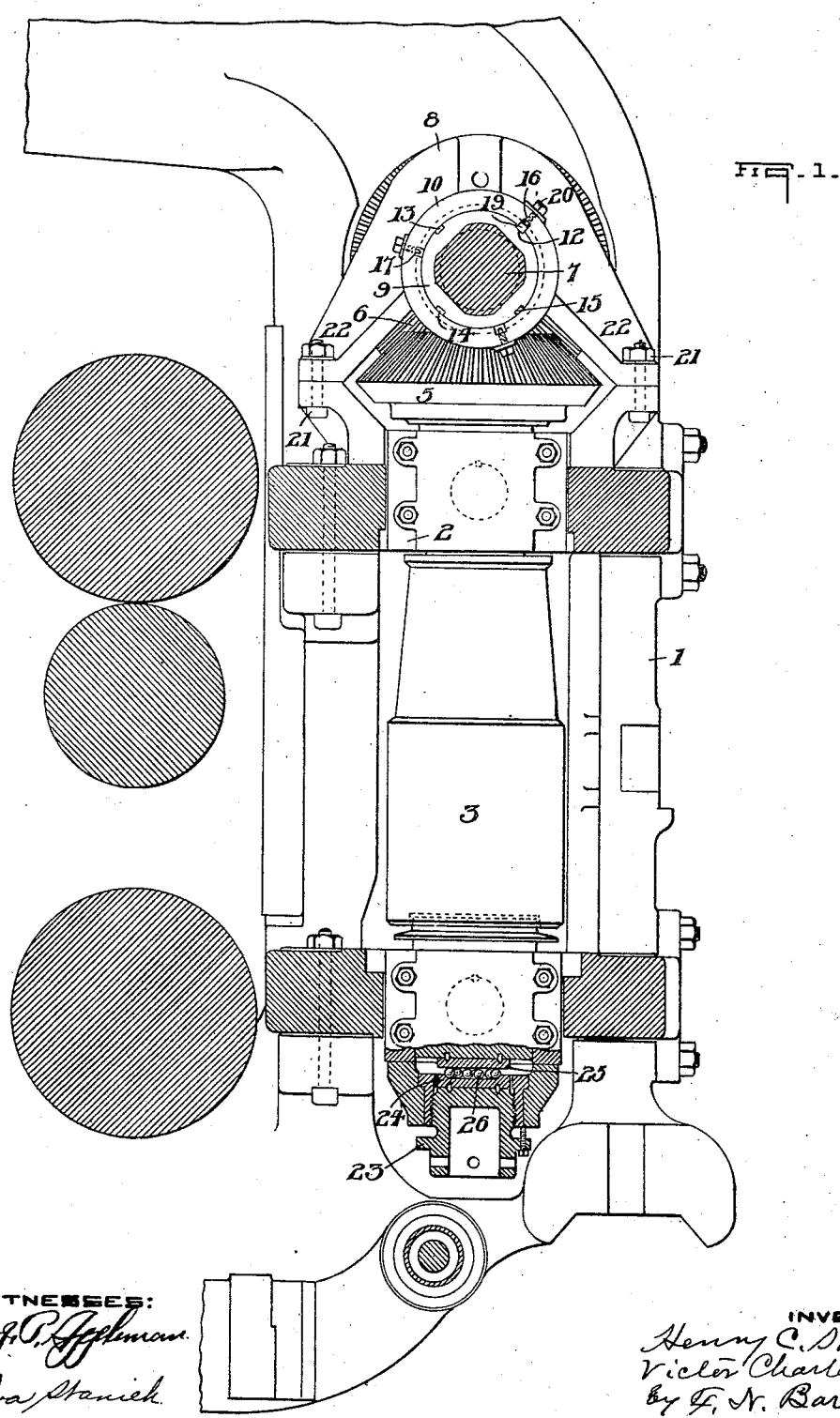

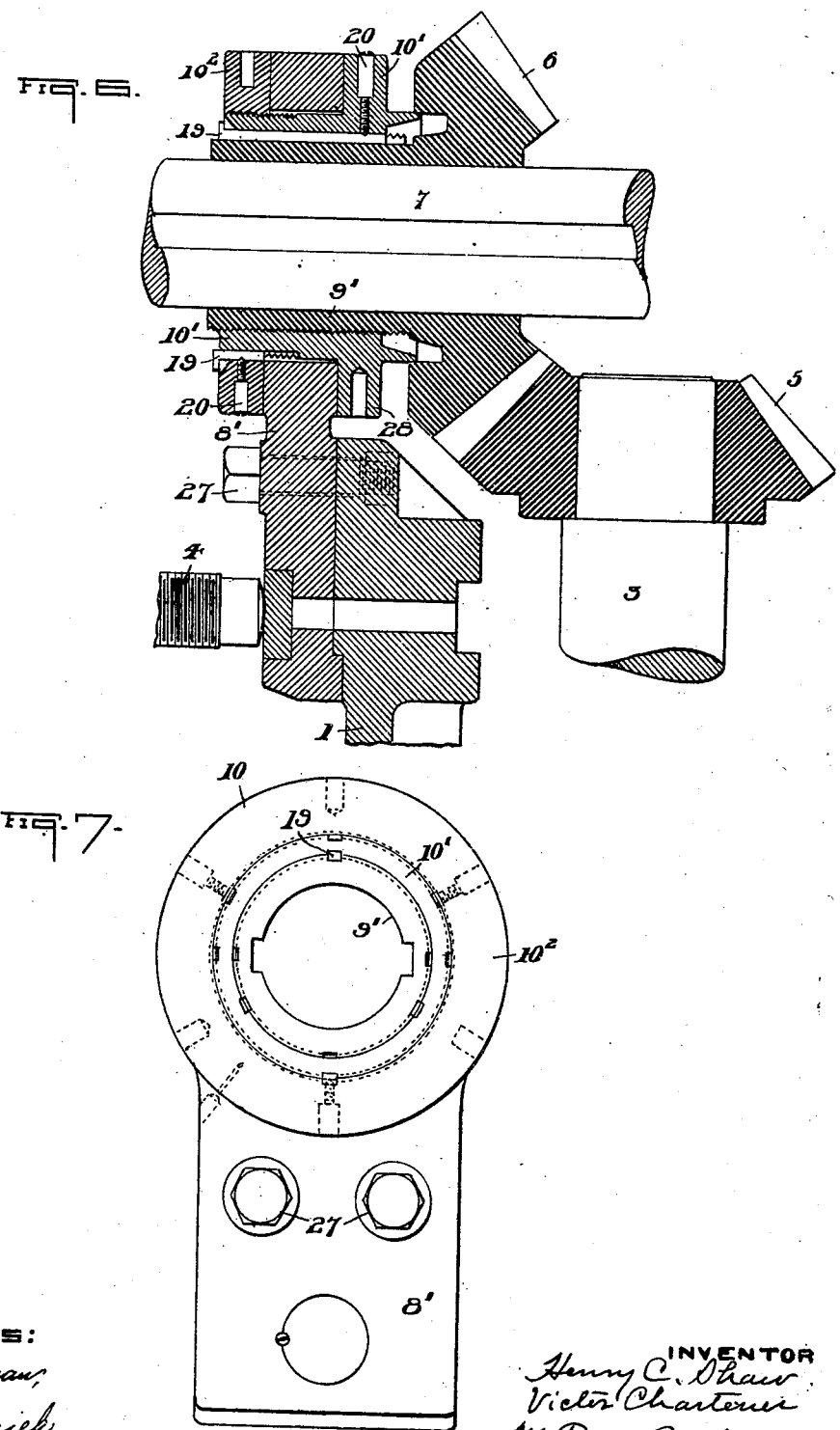

UNITED STATES PATENT OFFICE.

HENRY C. SHAW, OF GLENSHAW, AND VICTOR CHARTENER, OF PITTSBURG, PENNSYLVANIA, ASSIGNORS TO A. GARRISON FOUNDRY COMPANY, OF PITTSBURG, PENNSYLVANIA, A CORPORATION OF PENNSYLVANIA.

GEARING.

No. 860,944.

Specification of Letters Patent.

Patented July 23, 1907.

Application filed December 28, 1906. Serial No. 349,815.

*To all whom it may concern:*

Be it known that we, HENRY C. SHAW and VICTOR CHARTENER, citizens of the United States, residing at Glenshaw and Pittsburg, respectively, in the county of Allegheny and State of Pennsylvania, have invented or discovered new and useful Improvements in Gearing, of which the following is a specification.

Our invention relates to improvements in gearing for universal rolling mills.

The object of our invention is to take up the wear on the bearings of the rolls and their driving gear-wheels.

Referring to the drawings which accompany this specification, Figure 1 is a vertical section, partly in elevation, of one end of a universal mill containing our improvements; Fig. 2, a similar view taken at right angles to Fig. 1, the horizontal rolls being omitted; Fig. 3, a view showing the gear-adjusting ring in elevation; Fig. 4, a cross-section on the line 4—4 of Fig. 3; Fig. 5, an elevation of the ring-locking key; Fig. 6, a section through a portion of a housing and the bevel driving gears for the vertical roll; and Fig. 7, an elevation looking toward the right on Fig. 6, the shaft 7 and the screw 4 being omitted.

On Figs. 1 to 4 of the drawings, 1 represents one of the end housings of a universal mill and 2, the housing for the vertical roll 3. The latter housing is horizontally adjustable by means of the screws 4 in a manner well-known and particularly pointed out in United States Patent No. 750,860 granted to Paul Knecht, February 2, 1904, and need not be further described here as it constitutes no part of the present improvements. The roll 3 is driven by the bevel-gear 5 secured to the upper neck thereof, which bevel-gear meshes with the bevel-gear 6 rotatable with and slidable on, the driving shaft 7. The shaft 7 is journaled in the end housings of the mill, only one housing 1 being shown. Inasmuch as the roll 3 is adjustable horizontally and the gears 5 and 6 must be kept in mesh in all the adjustments of the roll, it is necessary to provide some means of securing the gear 6 to the housing 2. We may construct this means as follows: The housing 2 has the bonnet 8 which sits on the collar or extension 9 of the gear 6. The extension has its end on the opposite side of the bonnet from the gear 6 threaded and provided with the nut 10, between which and the bonnet, the washer 11 is preferably interposed. By turning the nut 10 the gear 6 may be drawn toward the gear 5 so as to take up any wear between the gears. In order to prevent the nut from turning back unaided, we have provided the threaded end of the extension 9 with a number of parallel slots or key-ways 12, 13, 14, and 15, and the nut 10 with a different number of interior slots 16, 17, and 18, parallel with each other and the slots 12 to 15. A key 19 is provided which may be slid endwise into a pair of registering slots in the collar and nut, a screw 20 being provided for engagement with the key to prevent its accidental removal. This key prevents the nut from turning on the collar 9. The slots being different in number in the collar and nut, a slight movement of the nut will cause a registration of the slots. Thus, if the key in the slots 12 and 16 be withdrawn, a slight rotation of the nut to the right would cause the slots 13 and 17 to register; another slight movement would cause the slots 14 and 18 to register, and so on. Many other ways of arranging the slots may be provided to cause the nut to be locked after a rotation thereof less than the space between the slots in the collar or nut. The nut may also be locked by devices varying widely from the means shown. To permit the longitudinal adjustment of the gear 6 and the collar 9, the shaft is made angular in cross-section to fit a corresponding axial opening in the said gear and collar. The bonnet is secured to the housing 2 by the bolts 21 which pass through the divergent arms 22 thereof. Removing the nuts from the bolts 21, the bonnet 8 may be lifted off from the collar 9, when the same becomes necessary for repairs. The lower end of the housing 2 is provided with a screw-plug 23 which is in axial alinement with the roll 3. The upper end supports a hard steel ball-race 24, between which and a hard steel plate 25 secured to the lower end of the roll 3 the anti-friction balls 26 lie. The plug 23 may be raised or lowered to secure the desired adjustment of the roll 6, when owing to wear or other reasons the same becomes desirable. By means of the plug the roll 3 may be raised so as to cause the gear 5 to approach the gear 6 to compensate for the wear of the gears. By the construction just described we are able to do away with the usual rest or rail on which the lower end of the vertical housings usually rest and slide. The housing which we have devised is self-contained.

Referring now to Figs. 6 and 7, the bonnet 8' is in the form of a vertical extension on the housing 2, the extension being secured to the housing by the bolts 27. The gear 6 has its collar or extension 9' turned opposite to the direction of the collar 9 in Fig. 2. The said collar extends through the bonnet 8' and is externally threaded to receive the nut 10' having the annular flange 28 which bears against the inner face of the bonnet. The collar 9' and the nut 10' are provided with slots and a key 19 to lock the collar and nut together as already explained with reference to the collar 9 and the nut 10. The nut 9' is externally threaded and provided with the nut $10^2$ which bears against the outer face of the bonnet 8'. This nut $10^2$ is locked from accidental rotation on the nut 10' by a key 19 and registering slots. By the rotation of the nut 10 in one direction or the other, the gear 6 may be moved toward or away from the gear 5. By rotating the nut $10^2$, the wear between the bonnet and the flange 28 can be taken up.

We claim—

1. The combination of a rotatable shaft, a housing which is movable transversely of the length of the shaft and in which the shaft is mounted, a bevel gear secured to said shaft, a second shaft, a bevel gear rotatable with and slidable on said second shaft and meshing with the first bevel gear, a housing for said second gear carried by the first named housing, and a movable threaded means connecting together the second bevel gear and the second housing, whereby the two gears may be adjusted one toward the other.

2. The combination of a rotatable shaft, a housing which is movable transversely of the length of the shaft and in which the said shaft is mounted, a bevel gear secured to said shaft, a second shaft, a bevel gear rotatable with and slidable on said second shaft and meshing with said first bevel gear, a housing for said second gear carried by the first named housing, a threaded extension projecting from said second bevel gear into said second housing and a threaded device coöperating with the second housing and the threads on said extension for adjusting the bevel gears one toward the other.

Signed at Pittsburg, Pa., by the said HENRY C. SHAW this 12th day of December, 1906, and by the said VICTOR CHARTENER this 26th day of December, 1906.

HENRY C. SHAW.
VICTOR CHARTENER.

Witnesses:
F. N. BARBER,
C. E. EGGERS.